United States Patent [19]

Louik et al.

[11] 4,439,128

[45] Mar. 27, 1984

[54] APPARATUS FOR MOLDING A RECORDED DISC HAVING A MOLDED-IN CENTER HOLE

[75] Inventors: Leonard Louik; Richard E. Ballard, both of Indianapolis, Ind.

[73] Assignee: RCA Corporation, New York, N.Y.

[21] Appl. No.: 412,111

[22] Filed: Aug. 27, 1982

[51] Int. Cl.$^3$ ............................................. B29D 17/00
[52] U.S. Cl. ..................................... 425/290; 425/810
[58] Field of Search ................. 425/290, 810; 264/107

[56] References Cited

U.S. PATENT DOCUMENTS

| | | | |
|---|---|---|---|
| 4,085,178 | 4/1978 | NcNeely et al. | 264/106 |
| 4,327,047 | 4/1982 | McNeely | 425/810 X |
| 4,362,492 | 12/1982 | Prusak | 425/309 |

FOREIGN PATENT DOCUMENTS 1187968 4/1970 United Kingdom .

*Primary Examiner*—Thomas P. Pavelko
*Attorney, Agent, or Firm*—Birgit E. Morris; Donald S. Cohen

[57] ABSTRACT

A mold for molding recorded discs includes a pair of mold plates, at least one of which is movable toward and away from the other mold plate and a center hole forming pin slidably mounted in an opening in one of the mold plates for movement toward and away from the other mold plate. The center hole forming pin includes an elongated rod having a passage extending longitudinally therethrough from an outer end to a closed inner end. A tube is mounted in the passage and divides the passage into an inner portion within the tube and an outer portion between the tube and the wall of the passage. A pair of tubular fittings are mounted on the rod with one fitting being connected to the inner portion of the passage and the other fitting being connected to the outer portion of the passage. A tubular sleeve cap is threaded on the closed end portion of the rod and is of a material harder than the material of the rod. The sleeve cap has a projection extending from its end which forms with the closed end of the rod a recess with the closed end of the rod being the bottom of the recess.

5 Claims, 2 Drawing Figures

APPARATUS FOR MOLDING A RECORDED DISC HAVING A MOLDED-IN CENTER HOLE

BACKGROUND OF THE INVENTION

The present invention relates to an apparatus for molding a recorded disc having a molded-in center hole, and more particularly to such an apparatus having a center hole forming pin with good wear and heat conducting properties.

In making high density information recorded discs, it has been found desirable to provide the discs with a relatively large center hole, i.e. about 1.5 inches (3.8 cm) in diameter. Although such holes can be punched through the disc after it is molded, it is more desirable to be able to form the hole as the disc is being molded. U.S. Pat. No. 4,327,047, to M. L. McNeeley, issued Apr. 27, 1982, entitled "Method for Producing Disc Records Having Molded-In Center Holes" describes an apparatus and method for molding-in a large center hole in the disc. As described in this patent, the disc molding apparatus includes a center hole forming pin having a recess in its end and a passage therethrough through which steam can flow to directly heat the pin.

One of the problems with the center hole forming pin shown in U.S. Pat. No. 4,327,047 was that when it become worn after a number of operating cycles the entire pin had to be replaced. To overcome this problem a center hole forming pin has been developed which includes a rod having a passage therethrough to its end and a cap secured to the one end by a screw. The cap is of a material which is harder than the rod and it has a recess in its end surface. The passage in the rod is for a heating medium. This center hole forming pin is shown and described in the patent application of John J. Prusak, Ser. No. 310,856, filed Oct. 13, 1981, entitled "Apparatus for Compression Molding Recorded Discs" now U.S. Pat. No. 4,362,492 issued Dec. 7, 1982 and assigned to the assignee of the present application. The cap being of a hard material has a longer life and when it becomes worn can be easily replaced. However, this center hole forming pin has the disadvantage that by adding the cap additional metal is placed between the end of the passage for the heating medium and the end of the center hole forming pin so as to affect the proper heating of the end of the pin.

SUMMARY OF THE INVENTION

A mold for molding a recorded disc includes a pair of opposed mold plates and a center hole forming pin slidably mounted in an opening in one of the mold plates for movement toward and away from the other mold plate. The center hole forming pin includes an elongated rod having a passage extending therethrough to a closed end. A sleeve cap is removably mounted around the rod adjacent the closed end. The sleeve cap projects beyond the closed end of the rod and forms with the closed end a recess which has the closed end as the bottom of the recess.

DETAILED DESCRIPTION OF PREFERRED EMBODIMENT

Figure 1:
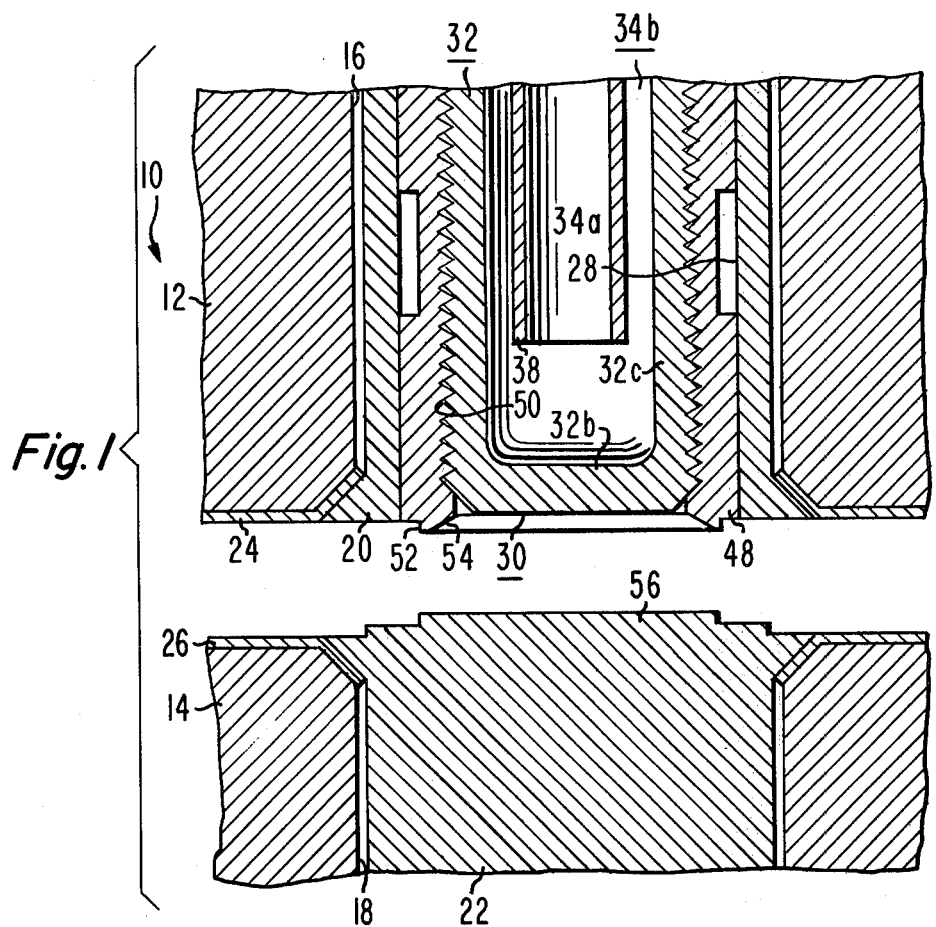
FIG. 1 is a sectional view of a portion of a mold which incorporates the center hole forming pin of the present invention.

Referring to FIG. 1, there is schematically shown a portion of an apparatus 10 for molding a recorded disc. The molding apparatus 10 includes upper and lower mold plates 12 and 14 which are mounted so that at least one of them is movable toward and away from the other. The mold plates 12 and 14 have aligned center openings 16 and 18 therethrough in which are mounted center plates 20 and 22 respectively. Stampers 24 and 26 are mounted on the opposed surfaces of the mold plates 12 and 14 respectively. The stampers 24 and 26 are thin metal plates having on the surface thereof the negative of the impression to be applied to the surface of the molded disc. The stampers 24 and 26 are in part secured to the mold plates 12 and 14 by the center plates 20 and 22 respectively. The upper center plate 20 has an opening 28 therethrough in which is mounted a center hole forming pin 30. The center hole forming pin 30 is slidable in the upper center plate 20 for movement toward and away from the lower center plate 22.

Figure 2:
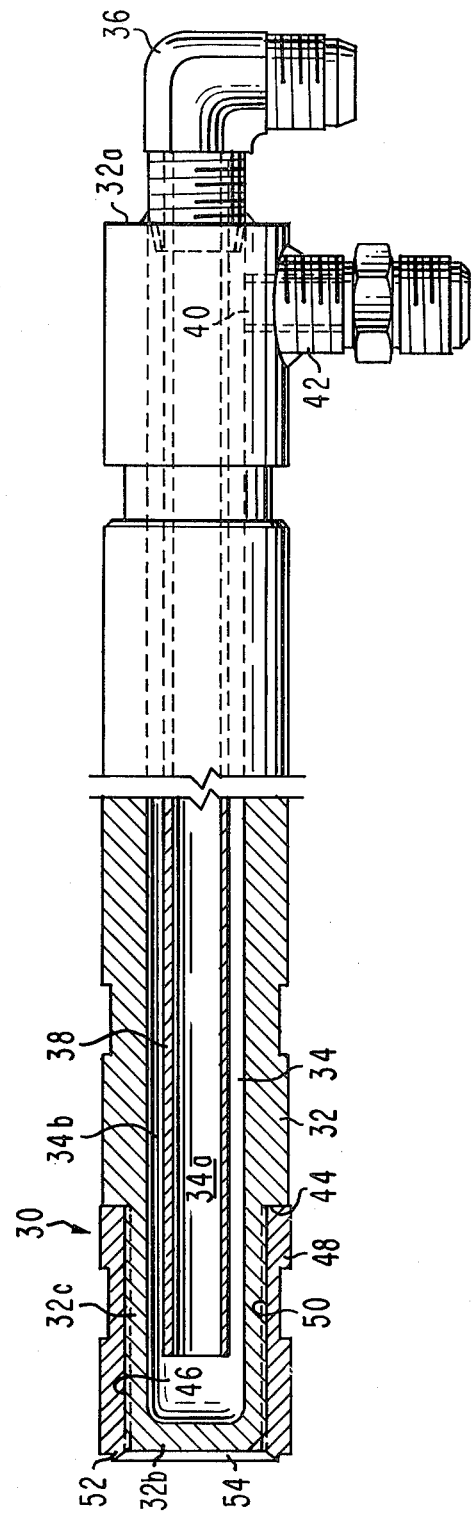
FIG. 2 is a view, partially in section, of the center hole forming pin of the present invention.

Referring to FIG. 2, the center hole forming pin 30 includes an elongated cylindrical rod 32 having a passage 34 extending longitudinally therethrough along its axis from its outer end 32a to a closed inner end 32b. An L-shaped tubular fitting 36 is secured in the open end of the passage 34 at the outer end 32a of the rod 32. An elongated tube 38 extends longitudinally along the passage 34 with one end of the tube 38 being secured in the fitting 36 to support the tube 38 spaced from the wall of the passage 34. The tube 38 extends from the fitting 36 to a point close to but spaced from the inner end 32b of the rod 32. Thus, the tube 38 divides the passage 34 into an inner portion 34a within the tube 38 and an outer portion 34b between the tube 38 and the wall of the passage 34. An opening 40 extends radially through the rod 32 to the passage 34 adjacent the outer end 32a of the rod 32. A straight tubular fitting 42 is secured in the opening 40. Thus, the inner portion 34a and outer portion 34b of the passage 34 provide a flow path between the fittings 36 and 42. The rod 32 has a reduced diameter portion 32c extending from its inner end 32b to a radial shoulder 44. The outer surface 46 of the reduced diameter portion 32c is threaded.

A tubular sleeve cap 48 having a threaded internal surface 50 is threaded on the reduced diameter portion 32c of the rod 32. The sleeve cap 48 is of a length to extend from the end surface of the closed inner end 32b to the shoulder 44. A cylindrical projection 52 extends from the end of the sleeve cap 48. The end surface 54 of the projection 52 tapers radially inwardly back toward the end surface of the inner end 32b. Thus, the projection 52 and the inner end 32b form a recess with the surface 54 being the outer wall of the recess and the end surface of the inner end 32b being the bottom of the recess. The sleeve cap 48 is of an outer diameter slightly larger than the diameter of the hole to be formed in the recorded disc. The projection 52 is of a diameter corresponding to the desired diameter for the hole to be formed in the recorded disc. The projection 52 is of a length approximately equal to but preferably slightly less than one-half of the thickness of the recorded disc. The sleeve cap 48 is of a material which is harder than the material of the rod 32. The sleeve cap 48 may be of the same composition as the rod 32 but heated so as to harden it, or it may be of a composition which is harder than that of the composition of the rod 32.

The lower center plate 22 has a cylindrical projection 56 extending from its upper surface. The projection 56 is of a diameter corresponding to the diameter of the hole to be formed in the recorded disc and of a length substantially equal to but preferably slightly less than one-half the thickness of the disc to be formed. The projection 56 is in direct alignment with the projection 52 on the sleeve cap 48 of the center hole forming pin 30.

A recorded disc is made in the apparatus 10 in the manner described in the previously referred to U.S. Pat. No. 4,327,047, and pending application Ser. No. 310,856 now U.S. Pat. No. 4,362,492. With the mold plates 12 and 14 separated (i.e. opened) a preform of the plastic material desired for the disc is placed between the mold plates 12 and 14. The mold plates 12 and 14 are then heated, such as by passing hot water or steam through channels (not shown) in the mold plates. The center hole forming pin 30 is also heated by providing a flow of the hot water or steam through the passage portions 34a and 34b from one of the fittings 36 or 42 to the other. The heated mold plates 12 and 14 are then moved toward each other (i.e. closed) and contact the preform to cause the material of the preform to flow radially outwardly between the stampers 24 and 26. The mold plates 12 and 14 are closed until they form a mold cavity of the size of the desired recorded disc.

As the mold plates 12 and 14 are closing, the center hole forming pin 30 is advanced through the preform to push out the plastic material from the center hole area. The center hole forming pin 30 is advanced until the end of the projection 52 of the sleeve cap 48 engages or is as close as possible to the end surface of the projection 56 of the lower center plate 22. As the center hole forming pin 30 moves through the plastic material, some of the plastic material will fill the recess formed by the end surface 54 of the projection 52 and the end surface of the inner end 32b.

When the mold plates 12 and 14 are completely closed and the center hole forming pin 30 is moved through the plastic material, the mold plates 12 and 14 and the center hole forming pin 30 are cooled by passing cooler water therethrough. This cools the material of the disc so that it hardens. This also hardens the plastic material which has filled the recess in the end of the center hole forming pin 30. The mold plates 12 and 14 are then opened to allow removal of the finished molded disc. When the center hole forming pin 30 is moved away from the lower center plate 22, the hardened plastic material in the recess in the end thereof will be retained therein.

During the molding of a disc, the sleeve cap 48 provides the surface of the center hole forming pin 30 which engages the plastic material to form the hole in the disc. Thus, the sleeve cap 48 provides the surface which is subject to wear. Since the sleeve cap 48 is of a harder material than the rod 32, it will last much longer before becoming worn. Since the sleeve cap 48 is much smaller in size than the rod 32, it can be hardened much easier than hardening the entire rod 32. Also, when the sleeve cap 48 does become worn, it can be easily replaced by merely unthreading the sleeve cap 48 from the end portion 32c of the rod 32 and threading a new sleeve cap 48 thereon. Thus, there is a minimum of down time when the sleeve cap 48 is replaced. Thus, the harder sleeve cap 48 not only provides for longer operation of the molding apparatus 10 before it becomes worn and must be replaced, but also permits its replacement with little down time of the molding apparatus.

In addition, the center hole forming pin 30 is directly heated by the flow of hot water or steam therethrough. This flow of the heating medium passes directly in contact with the closed inner end portion 32b of the rod 32. Since the closed end portion 32b forms a part of the recess which contacts the plastic material, there is a good conduction of heat from the heat providing material to the plastic material which is to be pushed aside by the center hole forming pin 30. Thus, the center hole forming pin 30 has the additional advantage of providing good heating of the plastic material to achieve proper formation of the hole in the disc being formed.

We claim:

1. In a mold for molding recorded discs which includes a pair of opposed mold plates and a center hole forming pin slidably mounted in an opening in one of said mold plates for movement toward and away from the other mold plate, the improvement comprising:

said center hole forming pin including an elongated rod having a passage therethrough to a closed end, said passage adapted to receive a flow of a heat control medium and a tubular sleeve cap having a longitudinal opening completely therethrough removably mounted around the rod at said closed end, said cap projecting beyond said closed end and forming with said closed end a recess with the closed end being the bottom of the recess.

2. A mold in accordance with claim 1 in which the sleeve cap is of a diameter larger than the diameter of the hole to be formed in the disc, a cylindrical projection extends from the end of the sleeve cap, said projection being of a diameter corresponding to the diameter of the hole to be formed and of a length no greater than one-half the thickness of the disc to be formed, said projection having an end surface which tapers radially inwardly toward the closed end of the rod, said tapered surface forming the outer wall of said recess.

3. A mold in accordance with claim 2 in which the sleeve cap is threaded on the end of the rod.

4. A mold in accordance with claims 1 or 2 in which the sleeve cap is of a material harder than the material of said rod.

5. A mold in accordance with claim 1 including a tube mounted in the passage in the rod and extending to a point adjacent to but spaced from the closed end of the rod, said tube dividing the passage into an inner portion within the tube and an outer portion between the tube and the wall of the passage, and a pair of tubular fittings mounted on said rod, one of the fittings being connected to the inner portion of the passage and the other fitting being connected to the outer portion of the passage.

* * * * *